(12) United States Patent
McKelvey et al.

(10) Patent No.: US 8,208,384 B2
(45) Date of Patent: Jun. 26, 2012

(54) SYSTEM AND METHOD FOR PROVIDING ALARM CONNECTIVITY WITHIN A NETWORK

(75) Inventors: Henry A. McKelvey, Capitol Heights, MD (US); Terrence E. Remy, Bowie, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1286 days.

(21) Appl. No.: 11/768,681

(22) Filed: Jun. 26, 2007

(65) Prior Publication Data

US 2009/0002149 A1 Jan. 1, 2009

(51) Int. Cl.
*H04L 12/26* (2006.01)
*H04L 12/66* (2006.01)
(52) U.S. Cl. .................... 370/242; 370/352
(58) Field of Classification Search .................. None
See application file for complete search history.

(56) References Cited

U.S. PATENT DOCUMENTS

| | | | | |
|---|---|---|---|---|
| 4,267,406 A * | 5/1981 | Perry | ............ | 379/102.05 |
| 4,887,290 A * | 12/1989 | Dop et al. | ............ | 379/33 |
| 5,029,290 A * | 7/1991 | Parsons et al. | ............ | 340/533 |
| 5,165,091 A * | 11/1992 | Lape et al. | ............ | 370/216 |
| 6,603,845 B2 * | 8/2003 | Jensen et al. | ............ | 379/142.01 |
| 7,385,995 B2 * | 6/2008 | Stiscia et al. | ............ | 370/412 |
| 2004/0136534 A1 * | 7/2004 | Stiscia et al. | ............ | 380/256 |
| 2008/0007621 A1 * | 1/2008 | Ying et al. | ............ | 348/156 |

\* cited by examiner

*Primary Examiner* — Hong Cho

(57) ABSTRACT

A system is provided for connecting an alarm system to a monitoring center through a fiber optic network. The alarm signals may be transmitted through the electrical wiring within a house or other facility through a fiber optic network and the PSTN and/or Internet to the monitoring center. The connection may include a reverse polarity in a pair of ring and tip lines between an interface device of the fiber optic network and a junction element of the alarm system or between the junction element and a controller of the alarm system. The reverse polarity may be created by connecting an end of a ring line into a tip adapter and connecting an end of a tip line into a ring adapter.

17 Claims, 4 Drawing Sheets

SYSTEM AND METHOD FOR PROVIDING ALARM CONNECTIVITY WITHIN A NETWORK

BACKGROUND

Some alarm systems are monitored from a remote location. For example, a home alarm system may be monitored by a central office of the alarm company through the telephone wires within the house and the public switched telephone network ("PSTN"). More and more homes are replacing their traditional telephone system copper wiring with fiber optic or other cable based telephone systems through networks such as passive optical networks ("PON"). More specifically, the telephone network transmission lines leading to the house are being replaced with fiber optic or other cable, while many houses maintain the copper wiring for distribution of telephony within the house. The introduction of the different transmission lines and associated networks may interfere with the alarm companies' abilities to monitor home alarm systems.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
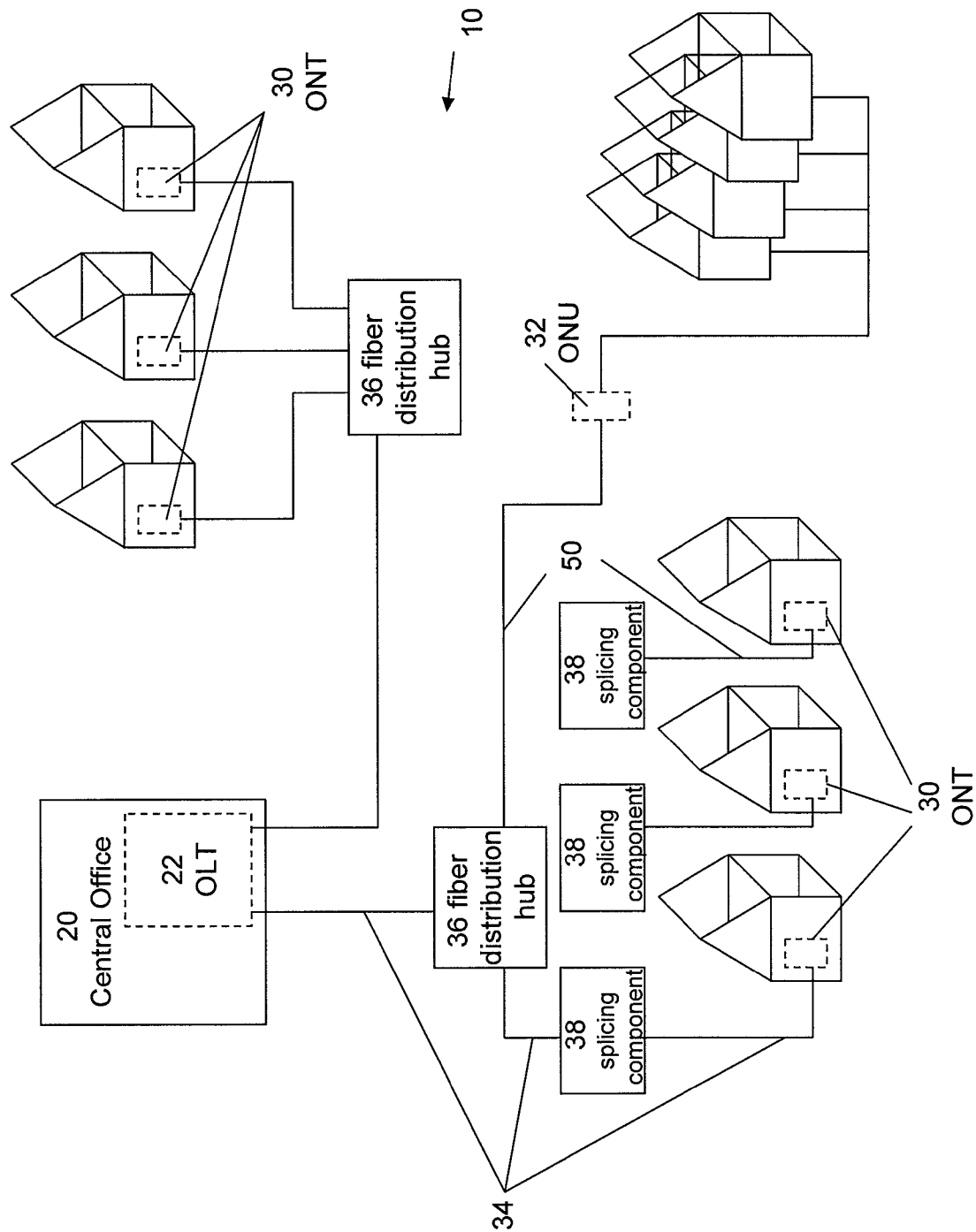
FIG. 1 is a block diagram of an optical fiber network consistent with exemplary embodiments.

Exemplary embodiments relate to a communication environment that includes one or more fiber optic networks. A fiber optic network includes a series of interconnected fiber cable links or branches extending between terminals and other network components. As an example, a fiber to the premises (FTTP), also referred to as fiber to the home (FTTH), system includes one or more fiber optic networks. As illustrated in FIG. 1, a FTTP system may include or otherwise be in communication with a provider's central office 20 that delivers optical signals to a plurality of subscribers through a passive optical network or PON 10. The passive optical network 10 may include an optical line terminal (OLT) 22 at the provider's central office and a plurality of optical network terminals (ONTs) 30 located at the premises of the subscribers, e.g., a customer home, office, or other facility. The passive optical network 10 may also include one or more optical network units (ONUs) 32 that function as gateways to additional sub-networks associated with other systems, such as fiber to the curb (FTTC) and fiber to the neighborhood (FTTN) systems. The OLT 22 can be connected to the ONTs 30 and ONUs 32 through a series of fiber link assemblies 34 and one or more fiber distribution hubs 36. The FTTP system may further include splicing components 38 for joining or separating fiber optic cable or, more particularly, one or more of the fibers within a cable.

A fiber link assembly 34 may include a fiber optic cable 50 or a portion of a fiber optic cable 50, e.g., one or more optical fibers, extending between two components of the network system. As examples and as illustrated in FIG. 1, a fiber link assembly 34 may include a fiber optic cable 50 extending between an OLT 22 and a fiber distribution hub 36, a fiber optic cable 50 extending between a fiber distribution hub 36 and a splicing component 38, or a fiber optic cable 50 extending between a splicing component 38 and an ONT 30.

Figure 2:
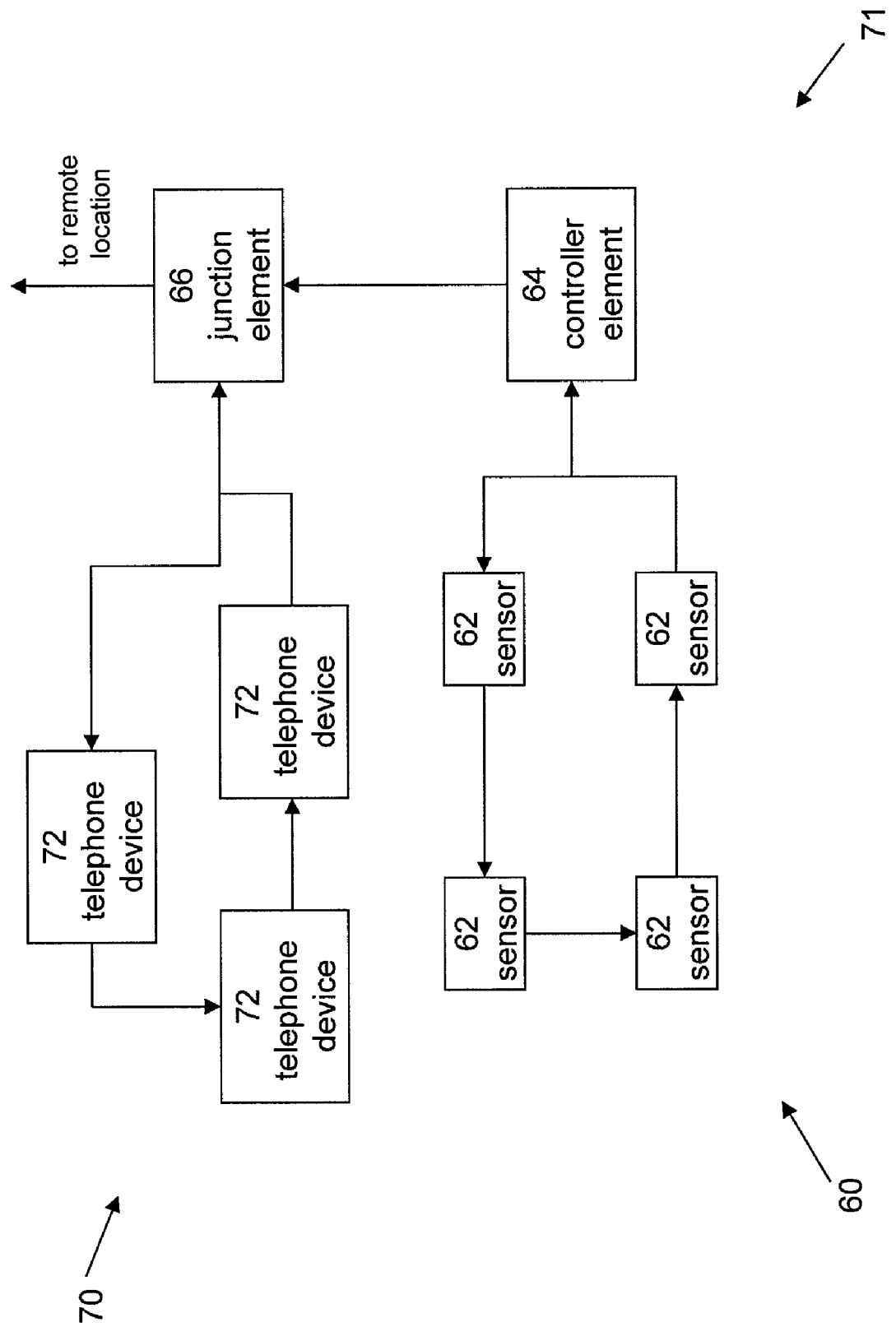
FIG. 2 is a block diagram of an alarm system and a telephone system according to an exemplary embodiment.

One or more of the premises of the subscribers may include an alarm system. The alarm system may be configured to monitor and detect various events and/or non-events at the premises. For example, the alarm system may be configured to detect one or more of the following: an intrusion into a building, a fire, an environmental hazard (e.g., carbon monoxide, radon), a water leak, a temperature range, and a request for help (e.g., panic button or request for medical assistance). As illustrated in FIG. 2, the alarm system 60 may include one or more sensors 62, a controller element 64, and a junction element 66. The sensors may include motion, gas, sound, temperature, humidity and other types of detectors. The sensors 62 may form at least one circuit with the controller element 64. A sensor 62 may open or close the circuit with the controller element 64 in response to an event. For example, a sensor may be configured to detect the opening of a door by either opening the circuit or closing the circuit with the door being moved relative to the door frame. The controller element 64, such as a microcontroller, microprocessor, or other computing device, may be configured to generate an alarm signal in response to a change in the circuit (e.g., the circuit is changed from being open to closed or closed to open). The alarm system 60 may include a speaker (not illustrated) to broadcast a local audio component of the alarm signal. In addition to or instead of the local audio component, the controller element 64 may be configured to send at least a component of the alarm signal to a remote location to indicate the possible intrusion or other event at the premises.

The junction element 66 may be configured to connect the alarm system 60 with a telephone system 70 of the premises. The telephone system 70 may include one or more telephone devices 72 or other telephonic devices. The telephone devices 72 form at least one circuit that leads to the junction element 66. An example of a junction element is a RJ31X. The telephone devices are interconnected through a pair of wires, i.e., a ring line and a tip line.

Figure 3:
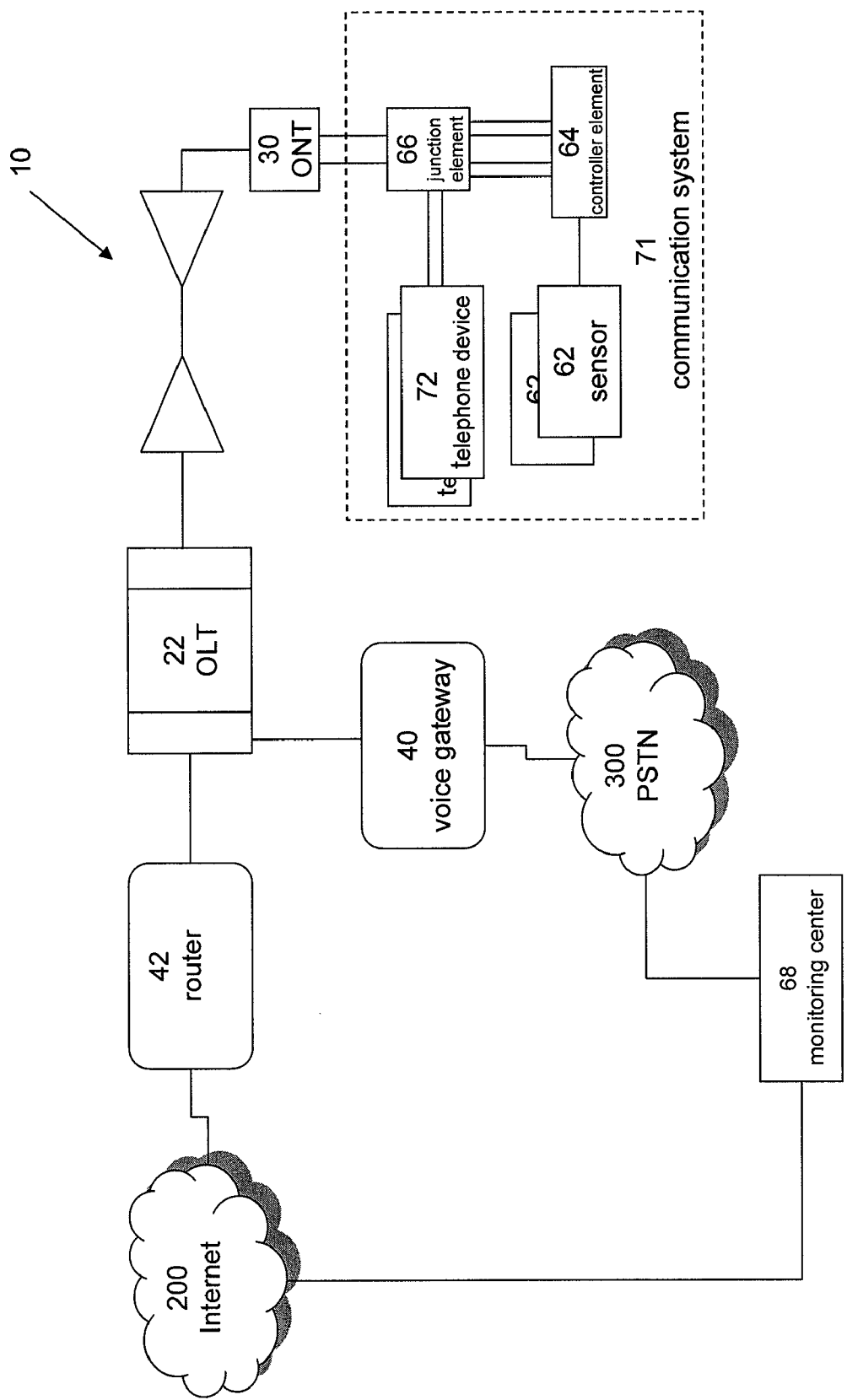
FIG. 3 is a block diagram of a telecommunication network environment consistent with an exemplary embodiment.

As shown in FIG. 3, the junction element 66 connects the alarm system 60 and the telephone system 70 to the fiber optic network 10. Collectively the alarm system 60 and the telephone system 70 are referred to herein as the communication system 71. The fiber optic network 10 may be connected to the PSTN 300 such that signals (e.g., alarm signal from the alarm system, telephone signal from the telephone system) may be transmitted between the PSTN 300 and the communication system 71 through the fiber optic network 10. As a more specific example, an alarm company may have a monitoring center 68 in communication with the PSTN 300 and may be configured to receive and send signals to the alarm system 60 through the fiber optic network.

The fiber optic network may include one or more components for converting or translating protocols for the signals sent between the monitoring center and the alarm system. For example and as illustrated in FIG. 3, from the junction element a signal may be transmitted to a first interface device of the fiber optic network, such as an ONT 30, through the fiber optic network to a second interface device of the fiber optic network, such as an OLT 22. From the OLT 22, the signal may be transmitted to a voice gateway 40. The voice gateway 40 may be configured to support a H.248 (Megaco) signaling protocol and real time protocol (RTP) on the ONT/PON/OLT end and a GR.303 signaling protocol on the PSTN end or another protocol recognized by Class 5 telephony switches (e.g., 5ESS, DMS 100, etc.).

Directing the signals between the alarm system 60 and the monitoring center 68 through the PSTN 300 is consistent with an exemplary embodiment. In an alternative embodiment, the signals may be directed through the Internet 200 (e.g., the World Wide Web) or other wide area network instead of or in addition to the PSTN 300. For purposes of an example, the Internet will be used hereafter as a representative wide area network. In instances where the signals are transmitted at least partially through the Internet 200, the telecommunication environment may include a router 42 for directing the signals over the Internet 200. Although the signaling protocol may vary, the signaling protocol for the Internet 200 may be session initiation protocol (SIP) or H.248. Like the alarm signals, telephone signals may be directed through the Internet 200 (e.g., VOIP).

As stated above, both the alarm system and the telephone system are connected to the junction element and the junction element is connected to the ONT. In general, the junction element is configured to allow the alarm signal to take priority over a telephone signal. Specifically, the junction element may be configured to cut off a telephone signal to allow an alarm signal to be sent to the monitoring center through the ONT and the rest of the fiber optic network and PSTN. The connection between the junction element and the telephone system, the controller of the alarm system and the junction element, and the junction element and the ONT may be through one or more twisted pairs of ring and tip lines. Typically, the tip line is the positive and the ring line is the negative of the 48 volt DC circuit of the telephone system The ONT may include at least a first adapter configured to receive a ring line and thus referred to as a ring adapter and a second adapter configured to receive a tip line and thus referred to as a tip adapter. Similarly, the junction element may at least a first adapter configured to receive a ring line and thus referred to as a ring adapter and a second adapter configured to receive a tip line and thus referred to as a tip adapter.

Figure 4:
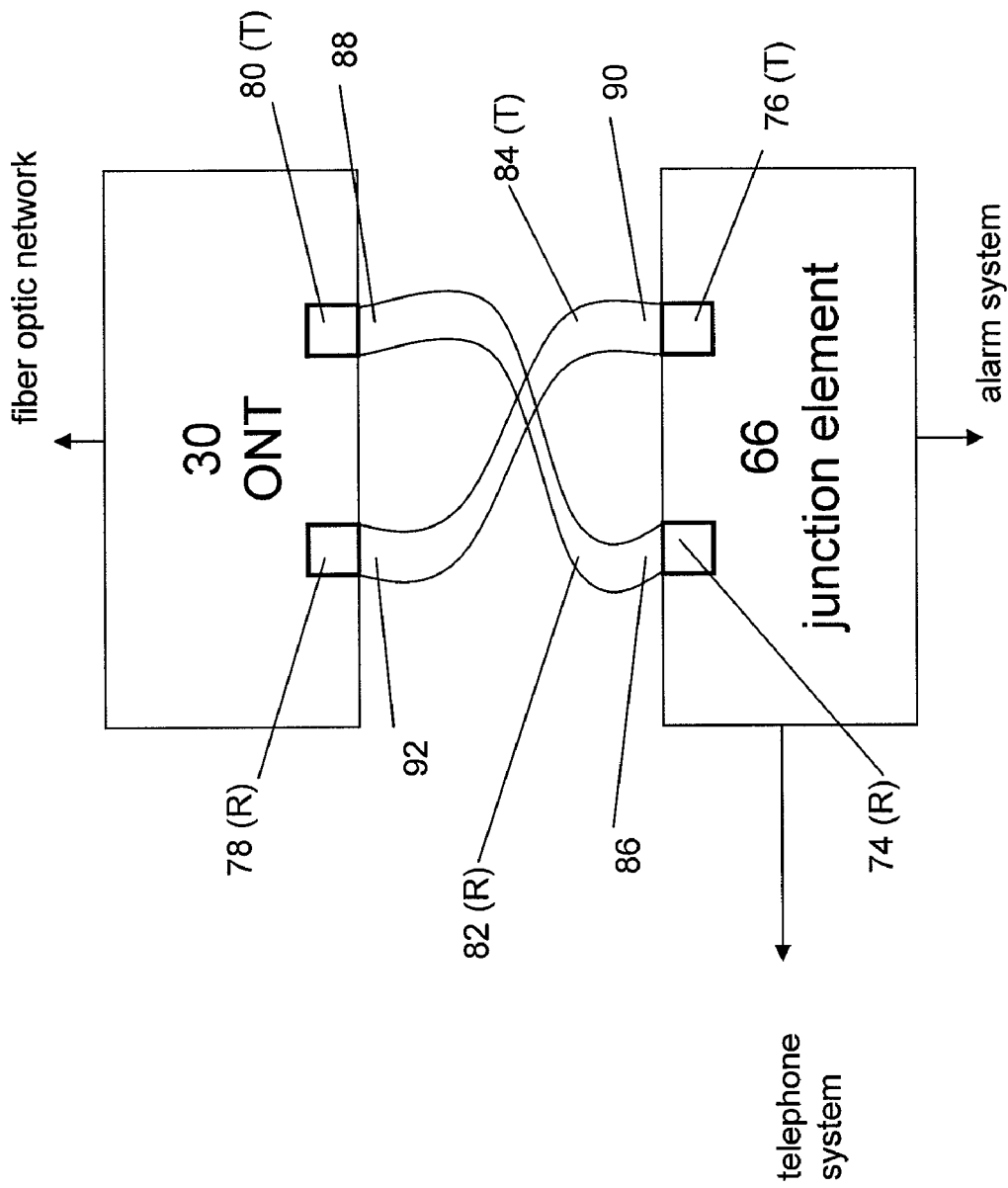
FIG. 4 is a block diagram of a connection between an ONT and a junction element according to an exemplary embodiment.

According to an embodiment illustrated in FIG. 4, the junction element 66 and ONT 30 are connected through a ring line 82 and a tip line 84. Each of the ring and tip lines 82, 84 extends from a first end 86, 90 to a second end 88, 92. The first end 86 of the ring line is connected to the ring adapter 74 of the junction element and the second end 88 of the ring line is connected to the tip adapter 80 of the ONT. The first end 90 of the tip line is connected to the tip adapter 76 of the junction element and the second end 92 of the tip line is connected to the ring adapter 78 of the ONT.

Reversing the polarity of the ring line 82 and the tip line 84 into the ONT 30 (i.e., placing the ring line into the tip adapter and the tip line into the ring adapter) relative to that at the junction element still allows for the telephone signals to be sent between the PSTN 300 and the telephone system 70 through the fiber optic network 10. Moreover, the reverse polarity allows for the alarm system to function through the fiber optic network. In general the alarm system was intended to work exclusively with the PSTN, i.e., the alarm system was intended to send signals over the traditional copper wires of the ring and tip lines and not over fiber optic lines. With the introduction of the fiber optic network, the alarm system and/or the signals between the monitoring center and alarm system may create issues. For example, the alarm system and/or the monitoring center may be configured to periodically test the connection between the two. However, due to the fiber optic network, the test may give a false error message. It is believed that the reverse polarity may reduce the likelihood that the test for the connection will provide a false error message.

In an alternative embodiment, reversing the polarity may occur at the first ends of the ring and tip lines. More specifically, according to this embodiment, the first end of the ring line is connected to the tip adapter of the junction element and the second end of the ring line is connected to the ring adapter of the ONT. The first end of the tip line is connected to the ring adapter of the junction element and the second end of the tip line is connected to the tip adapter of the ONT.

In yet another embodiment, reversing the polarity may occur between the controller of the alarm system and the junction element rather between the junction element and the ONT. For example, each of the junction element and the controller of the alarm system may have a first tip adapter and a second tip adapter. The junction element and the controller may be connected through at least a pair of ring and tip lines. The ends of the ring and tip lines may be reversed at one end either into the junction element and the controller of the alarm system. It is believed that reversing the polarity between the junction element and the controller of the alarm system may reduce the likelihood of false error messages generated by the alarm system.

In another embodiment a method is provided for configuring a phone system and an alarm system with a fiber optic network. The method may include connecting a junction element having at least a first ring adapter, a first tip adapter, a second ring adapter, and a second tip adapter to an optical network terminal in communication with a fiber optic network and having at least a ring adapter and a tip adapter through a first pair of a ring line and a tip line between the; and connecting a controller having at least a ring adapter and a tip adapter to the junction element through a second pair of a ring line and a tip line. The method further provides that one of said connecting operations includes forming the connection to have a reverse polarity in the tip and ring lines.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:
    a junction element having at least a first ring adapter, a first tip adapter, a second ring adapter and a second tip adapter;
    an optical network terminal in communication with a fiber optic network and having at least a ring adapter and a tip adapter;
    a controller having at least a ring adapter and a tip adapter;
    a first pair of a ring line and a tip line for forming a connection between the junction element and the optical network terminal; and
    a second pair of a ring line and a tip line for forming a connection between the junction element and the controller;
    wherein one of said connections between the junction element and the optical network terminal and between the junction element and the controller includes a reverse polarity in the tip and ring lines.

2. The system according to claim 1, wherein the reverse polarity is in the first pair of the ring line and the tip line and is formed by a first end of the ring line of the first pair being connected to the first tip adapter of the junction element and a first end of the tip line of the first pair being connected to the first ring adapter of the junction element.

3. The system according to claim 1, wherein the reverse polarity is in the first pair of the ring line and the tip line and is formed by a second end of the ring line of the first pair being connected to the tip adapter of the optical network terminal and a second end of the tip line of the first pair being connected to the ring adapter of the optical network terminal.

4. The system according to claim 1, wherein the reverse polarity is in the second pair of the ring line and the tip line and is formed by a first end of the of the ring line of the second pair being connected to the second tip adapter of the junction element and a first end of the tip line of the second pair being connected to the second ring adapter of the junction element.

5. The system according to claim 1, wherein the reverse polarity is in the second pair of the ring line and the tip line and is formed by a second end of the ring line of the second pair being connected to the tip adapter of the controller and the second end of the tip line of the second pair being connected to the ring adapter of the controller.

6. The system according to claim 1 further comprising at least one telephonic device in communication with the junction element, wherein the at least one telephonic device is configured to send and receive at least one telephone signal.

7. The system according to claim 6 further comprising at least one sensor in communication with the controller, wherein the controller is configured to generate an alarm signal in response to a change detected by the at least one sensor.

8. The system according to claim 7, wherein the junction element is configured to direct telephone and alarm signals from the at least one telephonic device and the controller to the optical network terminal for transmission through the fiber optic network.

9. The system according to claim 8, wherein the junction element is further configured to stop a telephone signal in order to allow an alarm signal to proceed.

10. A system comprising:
   a optical network terminal comprising a tip adapter and a ring adapter;
   a junction element comprising a tip adapter and a ring adapter; and
   a ring line and a tip line for forming a connection between the junction element and the optical network terminal, wherein the connection includes a reverse polarity in the tip and ring lines;
   wherein the system is configured to direct telephone and alarm signals from at least one telephonic device and a controller to the optical network terminal for transmission through a fiber optic network and to a public switching telephone network including stopping a telephone signal in order to allow an alarm signal to proceed.

11. The system according to claim 10, wherein the ring line extends from a first end to a second end and the tip line extends from a first end to a second end, and wherein the first end of the ring line is connected to the ring adapter of the optical network terminal, the first end of the tip line is connected to the tip adapter of the optical network terminal, the second end of the ring line is connected to the tip adapter of the junction element, and the second end of the tip line is connected to the ring adapter of the junction element for creating the reverse polarity.

12. The system according to claim 10, wherein the ring line extends from a first end to a second end and the tip line extends from a first end to a second end, and wherein the first end of the ring line is connected to the ring adapter of the junction element, the first end of the tip line is connected to the tip adapter of the junction element, the second end of the ring line is connected to the tip adapter of the optical network terminal, and the second end of the tip line is connected to the ring adapter of the optical network terminal for creating the reverse polarity.

13. A system comprising:
   a fiber optic network comprising an optical network terminal and an optical line terminal in communication with a public switching telephone network;
   a junction element in communication with the optical network terminal and having at least a first ring adapter, a first tip adapter, a second ring adapter and a second tip adapter;
   at least one telephonic device in communication with the junction element, wherein the at least one telephonic device is configured to send and receive at least one telephone signal;
   a controller in communication with the junction element and having at least a ring adapter and a tip adapter;
   at least one sensor in communication with the controller, wherein the controller is configured to generate an alarm signal in response to a change detected by the at least one sensor and wherein the junction element is configured to direct telephone and alarm signals from the at least one telephonic device and the controller to the optical network terminal for transmission through the fiber optic network and to the public switching telephone network including stopping a telephone signal in order to allow an alarm signal to proceed;
   a first pair of a ring line and a tip line for forming a connection between the junction element and the optical network terminal; and
   a second pair of a ring line and a tip line for forming a connection between the junction element and the controller;
   wherein one of said connections between the junction element and the optical network terminal and between the junction element and the controller includes a reverse polarity in the tip and ring lines.

14. The system according to claim 13, wherein the reverse polarity is in the first pair of the ring line and the tip line and is formed by a first end of the ring line of the first pair being connected to the first tip adapter of the junction element and a first end of the tip line of the first pair being connected to the first ring adapter of the junction element.

15. The system according to claim 13, wherein the reverse polarity is in the first pair of the ring line and the tip line and is formed by a second end of the ring line of the first pair being connected to the tip adapter of the optical network terminal and a second end of the tip line of the first pair being connected to the ring adapter of the optical network terminal.

16. The system according to claim 13, wherein the reverse polarity is in the second pair of the ring line and the tip line and is formed by a first end of the of the ring line of the second pair being connected to the second tip adapter of the junction element and a first end of the tip line of the second pair being connected to the second ring adapter of the junction element.

17. The system according to claim 13, wherein the reverse polarity is in the second pair of the ring line and the tip line and is formed by a second end of the ring line of the second pair being connected to the tip adapter of the controller and the second end of the tip line of the second pair being connected to the ring adapter of the controller.

* * * * *